United States Patent [19]
Kwoka

[11] Patent Number: 5,634,507
[45] Date of Patent: Jun. 3, 1997

[54] DRIVING DEVICE FOR VERTICALLY MOVABLE SHUTTERS

[75] Inventor: Georg Kwoka, Much, Germany

[73] Assignee: GKN Viscodrive GmbH, Lohmar, Germany

[21] Appl. No.: 541,798

[22] Filed: Oct. 10, 1995

[30] Foreign Application Priority Data

Oct. 11, 1994 [DE] Germany .......................... 44 36 237.4

[51] Int. Cl.$^6$ ..................................................... A47G 5/02
[52] U.S. Cl. ..................... 160/310; 160/8; 160/296
[58] Field of Search ................................. 160/310, 311, 160/312, 188, 189, 296, 291, 8

[56] References Cited

U.S. PATENT DOCUMENTS

| | | |
|---|---|---|
| 4,012,968 | 3/1977 | Kelbel . |
| 4,058,027 | 11/1977 | Webb . |
| 4,224,838 | 9/1980 | Roushdy et al. . |
| 4,836,051 | 6/1989 | Guimbretiere . |
| 4,905,808 | 3/1990 | Tomita et al. . |
| 4,966,268 | 10/1990 | Asano et al. . |
| 4,982,808 | 1/1991 | Taureg et al. . |
| 5,007,515 | 4/1991 | Shimizu . |
| 5,007,885 | 4/1991 | Yamamoto et al. . |
| 5,012,908 | 5/1991 | Kobayashi et al. . |
| 5,031,743 | 7/1991 | Morishita et al. . |
| 5,036,963 | 8/1991 | Murata . |
| 5,056,640 | 10/1991 | Yamamoto . |
| 5,063,738 | 11/1991 | Asano et al. . |
| 5,070,975 | 12/1991 | Tanaka et al. . |
| 5,080,187 | 1/1992 | Asano et al. . |
| 5,127,503 | 7/1992 | Gratzer . |
| 5,129,870 | 7/1992 | Pierce . |
| 5,178,249 | 1/1993 | Haga et al. . |
| 5,197,583 | 3/1993 | Sakai et al. . |
| 5,259,488 | 11/1993 | Oberdorster et al. . |
| 5,261,862 | 11/1993 | Pierce . |
| 5,267,916 | 12/1993 | Beim et al. . |

FOREIGN PATENT DOCUMENTS

| | | |
|---|---|---|
| 0247008 | 5/1987 | European Pat. Off. . |
| 0347165 | 6/1989 | European Pat. Off. . |
| 480175 | 9/1991 | European Pat. Off. . |
| 0549828 | 12/1991 | European Pat. Off. . |
| 0639730 | 8/1994 | European Pat. Off. . |
| 938813 | 7/1949 | Germany . |
| 4103054 | 8/1991 | Germany . |
| 4032245 | 3/1992 | Germany . |
| 64-87928 | 4/1989 | Japan . |
| 1126440 | 5/1989 | Japan . |
| 1220728 | 9/1989 | Japan . |
| 251626 | 2/1990 | Japan . |
| 2120529 | 5/1990 | Japan . |
| 2120530 | 5/1990 | Japan . |
| 337455 | 2/1991 | Japan . |
| 369829 | 3/1991 | Japan . |
| 2202602 | 9/1988 | United Kingdom . |
| 2222232 | 2/1990 | United Kingdom . |

*Primary Examiner*—David M. Purol
*Attorney, Agent, or Firm*—Dinnin & Dunn, P.C.

[57] ABSTRACT

The invention relates to a driving device for a roller shutter 1. For driving the roller shutter 1 into the open position there is provided a motor 8 with a drive 7 and a chain drive 5 which acts on the bearing shaft 3 of the roller 2 winding up the roller shutter 1. When using such shutters 1 as fire-resistant shutters 1, they must be transferable into the closed position under the influence of their dead weight, i.e. without involving any external energy. To allow the closing movement to proceed in a controlled way, the viscous coupling 10 constitutes a braking element whose housing is held non-rotatably and whose coupling hub is rotatably connected to the bearing shaft 3. The viscous coupling 10 is designed in such a way that in the rotational direction corresponding to moving the shutter into the open position, it generates practically no counter moment, whereas in the rotational movement resulting from moving the shutter 1 into the closed position, it generates a braking moment, allowing the shutter 1 to move into the closed position in a damped way. In this way it is possible to provide a simply designed driving device which is automatically adjusted to the respective direction and conditions of movement.

15 Claims, 4 Drawing Sheets

DRIVING DEVICE FOR VERTICALLY MOVABLE SHUTTERS

BACKGROUND OF THE INVENTION

The invention relates to a driving device for shutters, especially roller shutters, movable between a closed position and an open position, having a motor generating a rotational movement and optionally a drive, which motor and optionally drive, by means of driving elements, act on the shutter in the sense of setting it to the open position, having means which initiate an automatic transfer of the shutter into the closed position without the assistance of the motor, and having a braking element which decelerates the automatic movement of the shutter into the closed position under its dead weight.

In such a driving device intended for a fire-proof shutter, the braking element is provided in the form of a centrifugal brake which has a decelerating effect on the automatic movement of the shutter into the closed position under its dead weight (see brochure of Rolladenwerk Gebr. Effertz, Rheydt, "Elferrs Feuerschutz Rolltore", Druckzeichen 8.74). Such a centrifugal brake is complicated and expensive. When driving such a shutter it must be ensured that the closing movement is damped because the shutters consist of steel, comprise a considerable dead weight and in some cases considerable heights. The closing movement must be such as to avoid any damage, and furthermore, the braking element must not obstruct the return of the shutter into the open position. The closing movement under the dead weight of the shutter is essential because when a fire breaks out, for example, the closing function of the shutter must not depend on an energy source such as electric current.

SUMMARY OF THE INVENTION

It is the object of the invention to provide a driving device for such vertically movable shutters which is simple in its design, whose movement into the closed position is damped, without its movement into the open position being obstructed.

In accordance with the invention, the objective is achieved in that a viscous coupling acts as a braking element and comprises a coupling housing and a coupling hub as the coupling parts which, between them, form an operating chamber in the form of an annular cylinder, which viscous coupling, furthermore, between the coupling housing and the coupling hub, comprises annular plates which are arranged in a certain sequence, which partially overlap in the radial direction and are arranged in the operating chamber, and which viscous coupling, furthermore, comprises a filling of a highly viscous medium which fills the part of the operating chamber not occupied by the plates and is subjected to a permanent prepressure which is higher than the atmospheric pressure; that one of the two coupling parts is held non-rotatably; that the plates are designed in such a way that they apply a braking moment increasing as a function of the speed to the viscous coupling part which participates in a rotational direction and rotational movement corresponding to the movement of the shutter into the closed position; and that the plates, furthermore, are designed in such a way that, in the rotational direction opposed thereto and corresponding to the movement of the shutter into the open position, they exert a minimum braking effect on the coupling part participating in the rotational movement.

Such a viscous coupling comprises a simple design. It may be associated with various parts of the driveline without the need for any special adapting measures. The required damping characteristics may be set by the number of plates and their design and the viscosity selected for the viscous medium.

In a preferred embodiment, the part of the operating chamber not occupied by the plates is filled completely with the highly viscous medium. In this way, under the influence of the prepressure, the viscous coupling is set particularly quickly to the required braking effect, even if the speed differentials are low.

According to an advantageous embodiment, the plates in the operating chamber associated with the non-rotatably held coupling part are held at a fixed distance from one another by spacers, with the plates being provided with apertures or slots.

In a particularly advantageous embodiment, the coupling housing constitutes the non-rotatably held coupling part and the coupling hub the rotatably held coupling part.

For achieving the required braking effect, it is proposed that the annular plates associated with the rotatable coupling part, starting from their outer and inner circumference, comprise slots which extend over part of the radial extension of said plates and which, between them, form segments which are all inclined in the same direction and by the same dimension relative to a plane on which the rotational axis of the associated coupling part is positioned perpendicularly.

Furthermore, to put the invention into effect, the plates are arranged in such a way that between each two spaced plates associated with the non-rotatably held coupling part, there are arranged two plates which comprise inclined sectors and are associated with the rotatable coupling part; that the plates are displaceable in the direction of the longitudinal axis of the coupling part and are arranged so as to be rotatable therewith and that the two plates comprising inclined sectors are arranged in phase and side by side in such a way that the sectors are inclined in opposite directions, thus forming gaps which narrow in size against the rotational direction of the rotatable coupling part, which direction corresponds to the movement of the shutter into the closed position.

The plates associated with the rotatable coupling part are displaceable in the direction of the longitudinal axis of the coupling part and arranged so as to rotate therewith. Both plates provided between two spaced plates and comprising inclined sectors are arranged in respect of the inclination of the sectors in such a way that there occurs a narrowing gap, with the gap narrowing in the direction opposed to the direction of rotation in which the rotatable coupling part moves when the shutter is set to the closed position.

Viscous couplings are known in themselves. For example, such a coupling is described in GB-PS 1 357 106. Such couplings are normally used in the driveline of a motor vehicle.

According to a first embodiment, the required prepressure may be set when the remaining part of the operating chamber is filled with the viscous medium. Furthermore, to maintain the prepressure in the operating chamber, a spring-loaded piston may be used. In order to limit, from the outside, the effect of temperature on the function of the viscous coupling in the case of shutters, e.g. roller shutters used as fire-proof shutters, there is provided a temperature compensating device for the increase in pressure in the operating chamber, starting from the level of the prepressure if the temperature rises. For this purpose, there is preferably provided a piston adjustable against a spring.

If the shutter is designed as a roller shutter, a first possibility of arranging the viscous coupling consists in connecting same to the roller which serves to wind up the shutter.

In such a case, the rotatable coupling part of the viscous coupling is connected to the bearing shaft of the roller.

However, it is also possible for the rotatable coupling part of the viscous coupling to be connected to the output shaft of the motor, of a drive connected thereto or of a driving element connected thereto.

If the shutter is provided in the form of a roller shutter it is proposed furthermore that the driving element between the motor or the drive following same and the roller for winding up the roller shutter is provided in the form of a chain drive.

Preferred embodiments of the viscous coupling used in a driving device for roller shutters and the design of the viscous coupling are schematically illustrated in the drawing and explained in greater detail with reference to same.

DESCRIPTION OF THE PREFERRED EMBODIMENT(S)

Figure 1:
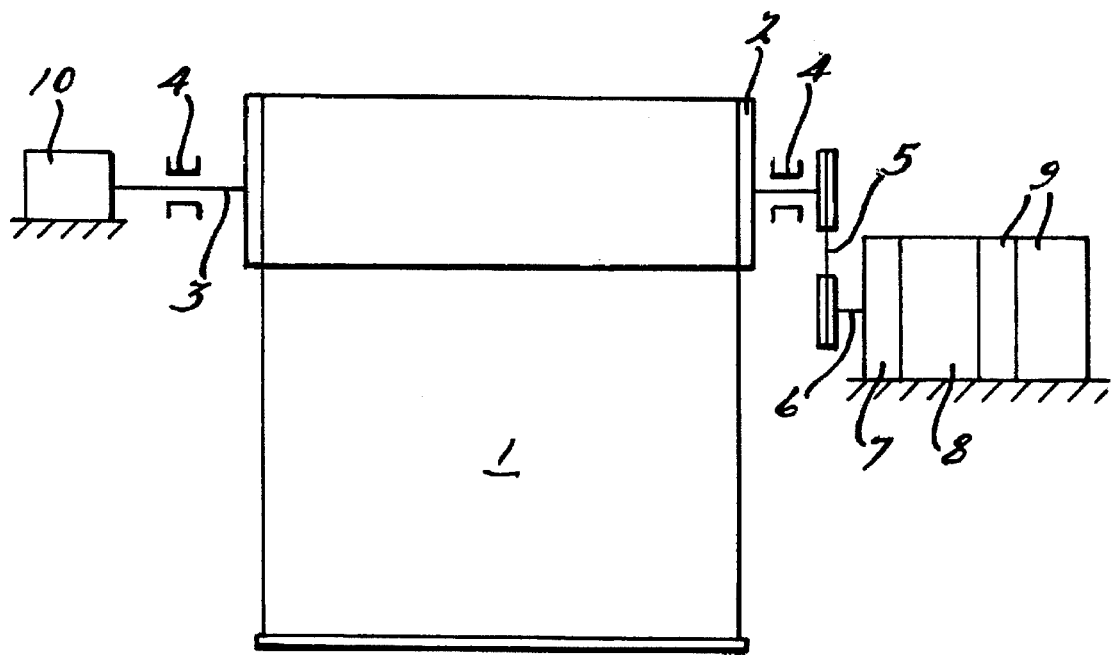
FIG. 1 shows a first embodiment of the driving device for a roller shutter.

FIG. 1 shows a first embodiment of the driving device for a roller shutter 1 which may be wound on to a roller 2. The shutter 1 is illustrated in a condition where it is partly unwound from the roller 2. The roller 2 is non-rotatably connected to a bearing shaft 3 by means of which it is rotatably held in roller bearings 4. One of the stubs of the bearing shaft 3 is connected to a chain drive 5. For this purpose, the bearing shaft 3 carries a chain gear which is embraced by a chain secured by a further chain gear associated with the output shaft 6 of a drive 7. The drive 7 is driven by a motor 8 acted upon by setting means 9. The setting means 9 also serve to hold the roller shutter 1 in the open position where it is fully wound on to the roller 2, but also to eliminate the holding function for example when a fire or other events occur so that the shutter 1 is moved into its closed position under the influence of its dead weight. To ensure that, under the influence of the dead weight of the shutter, the shutter movement into the closed position is damped, there is provided a viscous coupling 10 which is directly connected to the bearing shaft 3 of the roller 2 and acts on same by means of an increasing braking moment as the unwinding speed of the shutter increases.

In the driving device embodiment according to FIG. 2, the shutter is again provided in the form of a roller shutter 1 which may be wound on to a roller 2 whose bearing shaft 3 is rotatably held in roller bearings 4. For moving the roller shutter 1 into the open position, the bearing shaft 3 is driven by a chain drive 5 connected to said bearing shaft 3. The chain drive 5 is connected to an output shaft 6 of a drive 7 which is driveable by a motor 8 acted upon by setting means 9. The setting means also have the function of ensuring that, under normal circumstances, the roller shutter 1 is held in the open position, but that, in cases where an event, for instance a fire, occurs, the connection is released so that the shutter 1 is unwound from the roller 2 into the closed position, with the movement into the closed position being damped by a viscous coupling 10. The viscous coupling 10 is non-rotatingly connected to an extension of the output shaft 6 of the drive 7.

Figure 3:
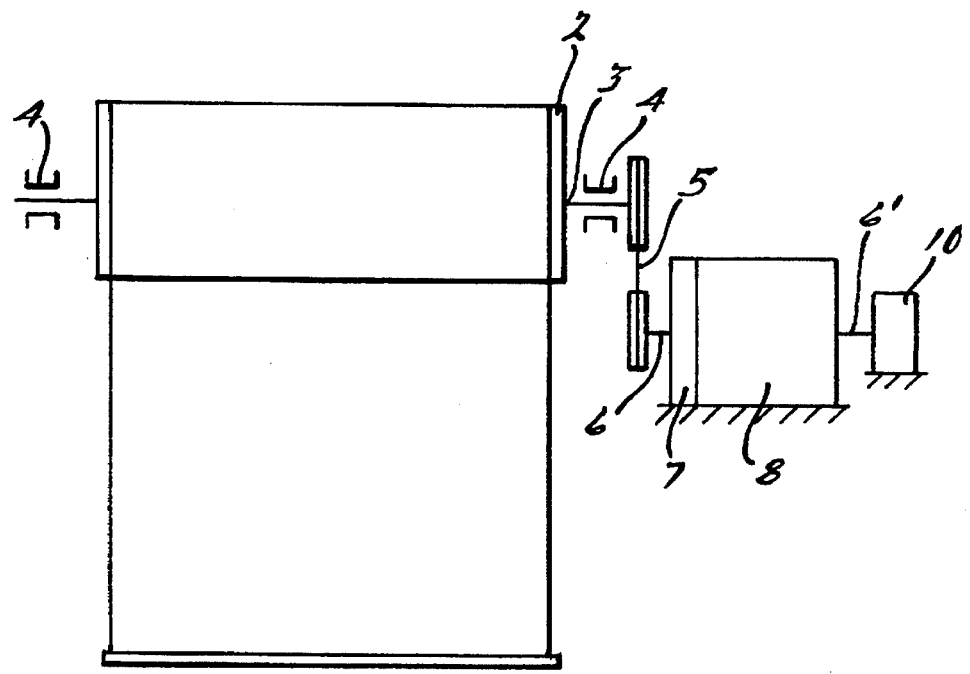
FIG. 3 shows a third possibility of arranging the viscous coupling in a driving device for a roller shutter.

In the case of the embodiment according to FIG. 3, there is also provided a roller shutter 1 which may be unwound from a roller 2. The roller 2 is non-rotatably connected to a bearing shaft 3 rotatably held in roller bearings 4. Furthermore, a chain drive 5 rotatably connected to the output shaft 6 of a drive 7 is attached to the bearing shaft 3. The drive 7 is driven by a motor 8 which also comprises an output shaft 6' which projects from the motor end facing away from the drive 7 and which is non-rotatably connected to a viscous coupling 10 which has a damping effect on the shutter movement when the free movement of the roller shutter 1 from the open position into the closed position is released.

Figure 2:
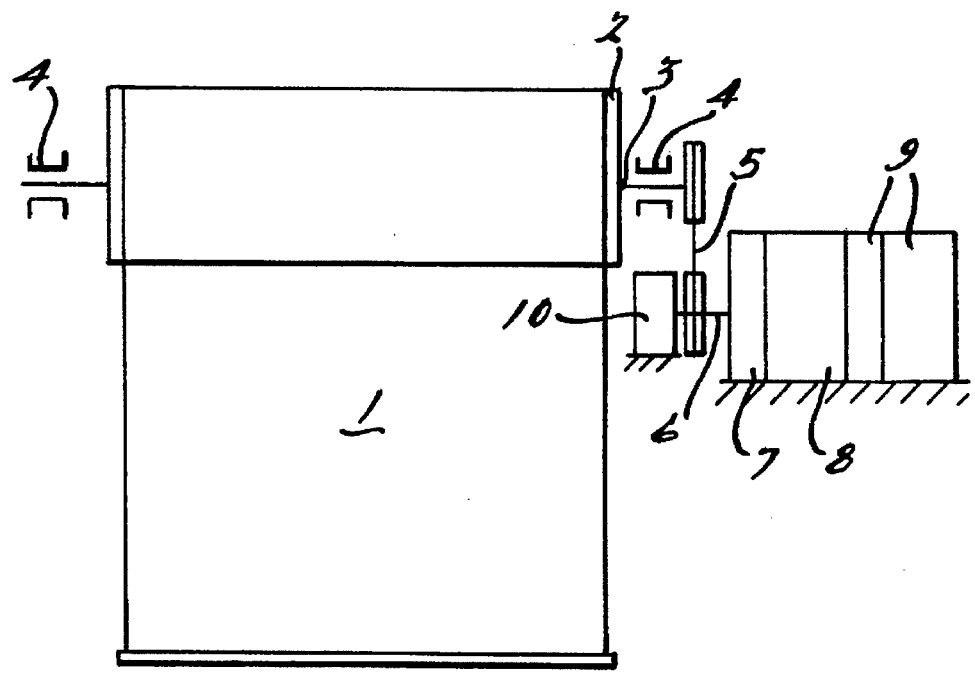
FIG. 2 shows a second embodiment illustrating a possibility of arranging the viscous coupling within the driving device for a roller shutter.

Design and functioning of the viscous coupling 10 which is suitable for being arranged as illustrated in FIGS. 1 to 3, is explained in greater detail with reference to FIGS. 4 to 8.

Figure 4:
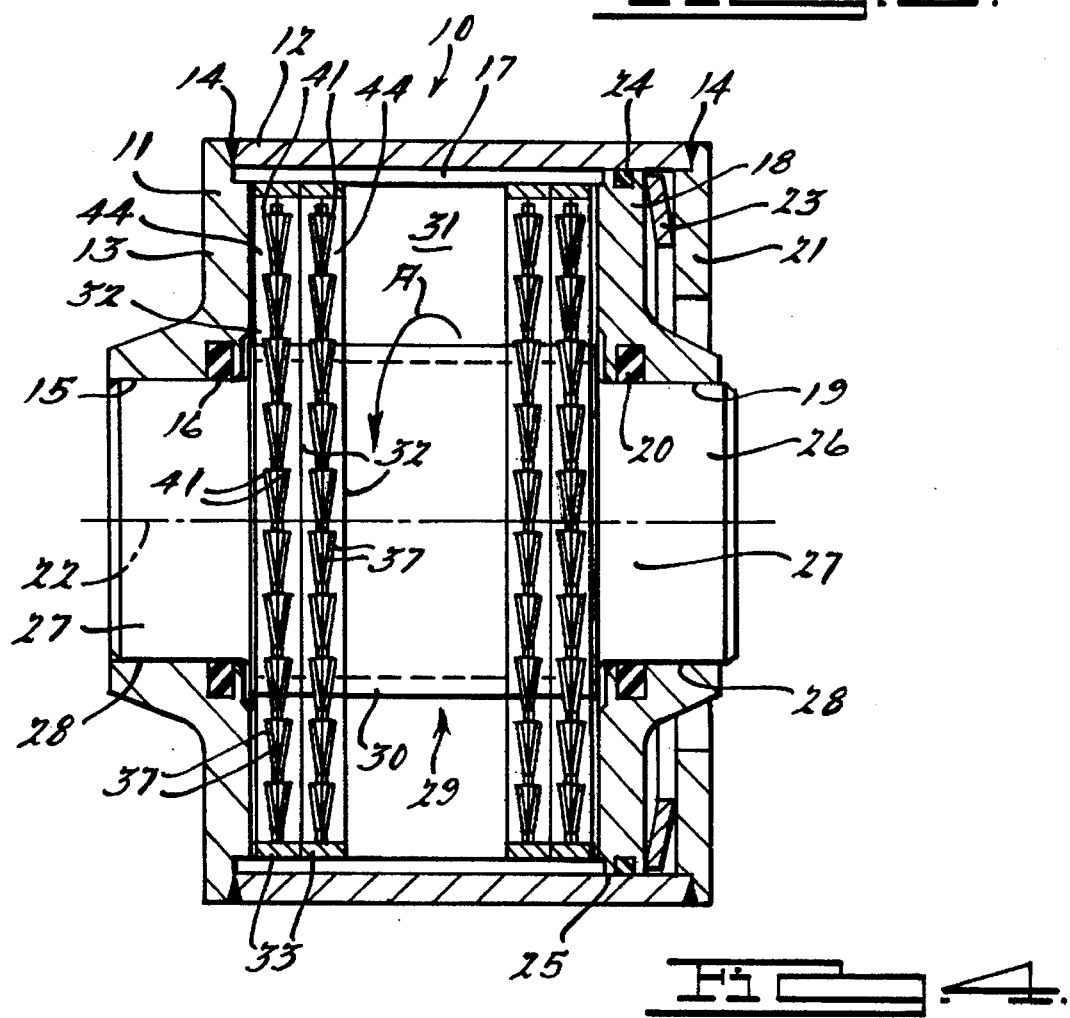
FIG. 4 shows the design of the viscous coupling, with the housing being shown in a radial section, so that the plates are visible across their entire circumference in a plan view and with the plates assuming a position corresponding to the rotational direction derived from the movement of the shutter into the open position.

FIG. 4 shows a viscous coupling 10 comprising a coupling housing 11 consisting of the substantially cylindrical housing casing 12 and a first cover 13 firmly connected thereto. The longitudinal axis of the housing has been given the reference number 22. The cover 13 is connected by a weld 14 to the housing casing. The cover 13 comprises a bearing bore 15 having a groove into which there is inserted a seal 16. The housing casing 12 is provided with toothing 17.

Towards its end facing away from the first cover 13, the housing casing 12 comprises a cylindrical bore step 25 which adjoins the toothing 17 and in which a second cover 18 is axially adjustably guided. Between the bore step 25 and the outer circumference of the second cover 18 there is inserted a seal 24. The second cover or piston 18, furthermore, comprises a further beating bore 19 which is provided with a recess which is engaged by a seal 20. Furthermore, the housing casing 12 is associated with a supporting disc 21 which is firmly connected by a weld 14 to the housing casing 12. Between the second cover 18 and the supporting disc 21, there is arranged a spring 23 which permits and effects an axial adjustment of the second cover or piston 18 in the direction of the longitudinal axis 22. A coupling hub 26 whose longitudinal axis and rotational axis correspond to the longitudinal axis 22 is received by means of its beating journal 27 and the bearing faces 28 provided thereon in the two bearing bores 15, 19 of the two covers 13, 18. In its center, the coupling hub 26 comprises a toothed portion 29 whose teeth 30 are circumferentially distributed and extend parallel to the longitudinal axis 22. The seals 16, 20 and 24 seal the annular cylindrical operating chamber 31 formed between the outer face of the coupling hub 26 and the inner face of the coupling housing 11. Furthermore, there are provided means (not illustrated) to ensure that the coupling housing is held non-rotatably; they may be provided in the form of a bracket or a torque support. The coupling hub 26 is provided with means (not illustrated) to be connected to a shaft, especially the bearing shaft of the roller for winding up the roller shutter or to the output shaft of a drive or motor, to suit the applications as illustrated in FIGS. 1 to 3.

Figure 6:
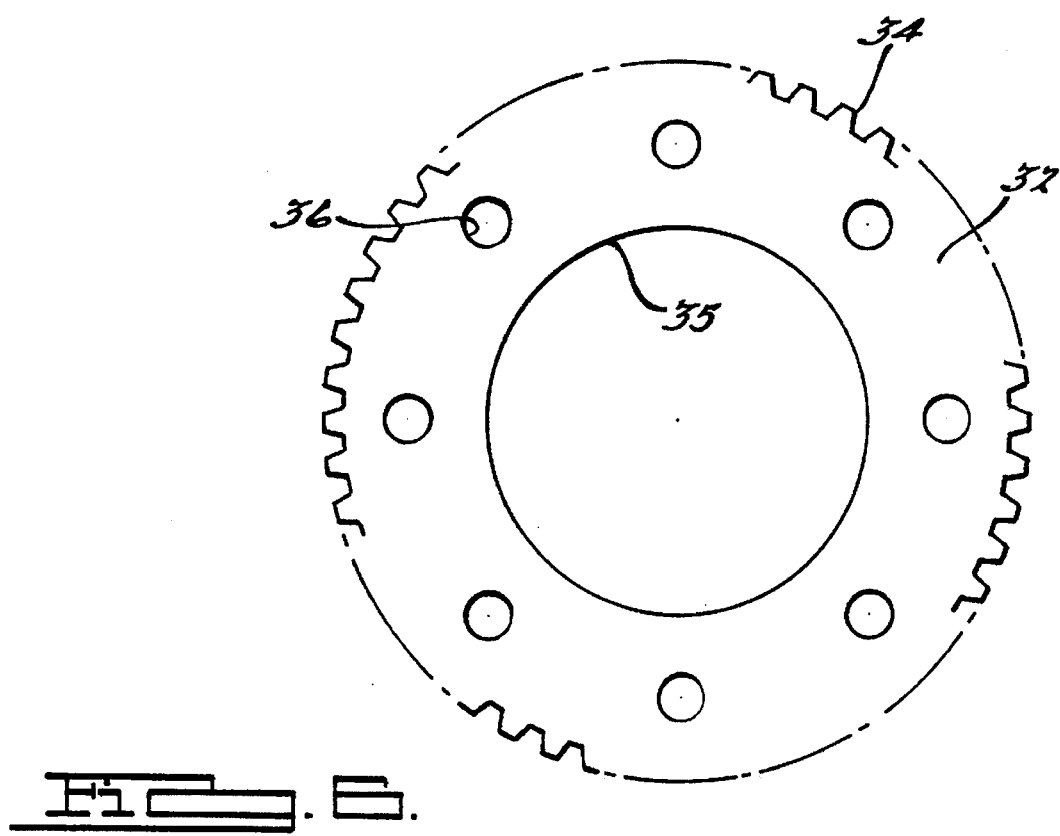
FIG. 6 shows an outer plate for the driving device.

In the operating chamber 31, plates 32, 37, i.e. outer plates 32 and inner plates 37 are arranged so as to be distributed along the longitudinal axis 22; only some of the plates are shown. The outer plates 32 are associated with the coupling housing 11. For this purpose, the outer circumference of the outer plates 32—as illustrated in FIG. 6—is provided with toothing 34 which corresponds to the toothing 17 of the housing casing 12. It can be seen that the outer plates 32 also comprise a bore 35 allowing the coupling hub 26 to pass through with radial play. Furthermore, the annular face of the outer plates 32 is provided with circumferentially distributed apertures 36.

The outer plates 32 according to FIG. 6 are non-rotatably connected to the toothing 17 and, in addition, they are held at a fixed distance from one another by spacers in the form of spacing rings. There is thus formed a gap 44 of a fixed size between two outer plates 32. Each of the gaps formed between two outer plates 32 is associated with two inner plates 37 as shown in FIGS. 7A and 7B.

Figure 5:
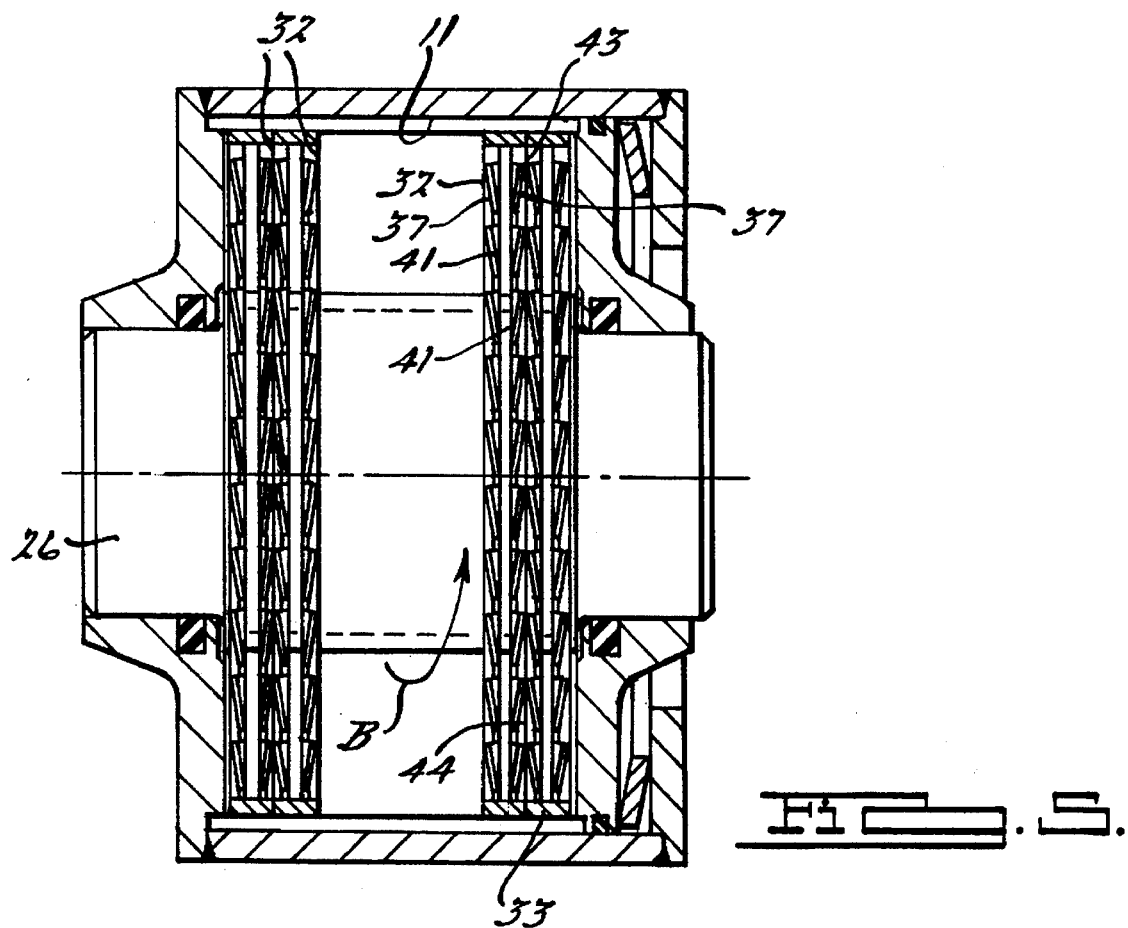
FIG. 5 shows the viscous coupling according to FIG. 4, with the plates being in a position during a rotational movement which corresponds to the movement of the shutter from the open position into the closed position under the influence of its dead weight.
Figures 7A, 7B:
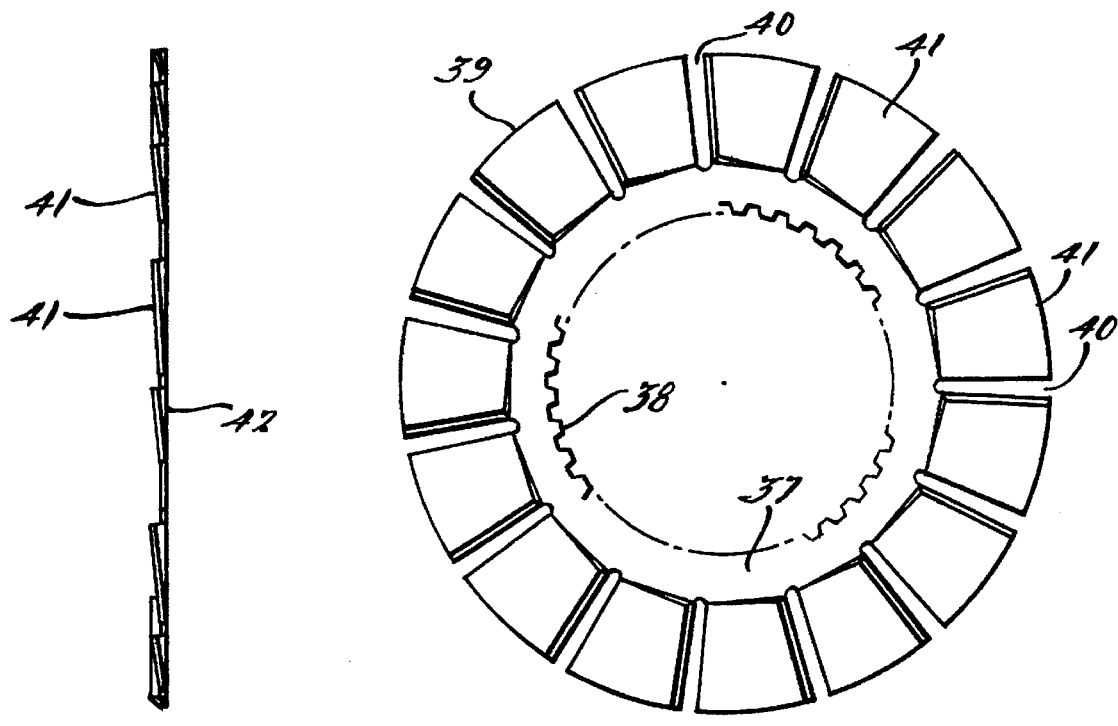
FIG. 7A shows a cross section of an inner plate according to the present invention.
FIG. 7B shows a view of an inner plate for the driving device.

The inner plates 37 according to FIGS. 7A and 7B comprise a bore 38 which is toothed. They also comprise slots 40 which start from their circumference 39 and extend over part of the radial extension of the inner plates 37, so that between each two slots 40 there is formed a segment 41. All segments 41 are inclined towards a plane 42 in one direction and with a predetermined dimension. The arrangement of the inner plates will now be explained with reference to FIG. 4. A first inner plate 37 is arranged in such a way that the inclination of the segments 41 is such that, regarding the first inner plate 37 following the first cover 13, in the rotational direction A of the coupling hub 26 relative to the coupling housing 11, in the drawing the distance of the surface of each segment 41 from a base close to the first cover 13 increases towards a base remote from the cover. The second inner plate 37 arranged in the same gap, with its sides reversed, is associated with the coupling hub 26 so that the inclination of each segment 41 extends with a base remote from the first cover 13 towards a base approaching the cover 13. Between the two inner plates 37 there is assumed a minimum distance in the rotational direction A which corresponds to the direction of movement of the shutter from the closed position into the open position, i.e. the inner plates 37 are in a position where they approach one another. By means of their toothing 38, they are received in the toothing 30 of the toothed portion 29 of the coupling hub 26 so as to be non-rotatable, but displaceable in the axial direction, i.e. the direction of the longitudinal axis 22. When the roller shutter is moved into the open position by the motor, the coupling hub 26 is forced to carry out a rotational movement which corresponds to the rotational direction A. In the process, a shear effect is exerted on the viscous medium, e.g. a highly viscous silicone oil, contained in the operating chamber 31, but as a result of the hydrodynamic effect, the inner plates 37 are held in contact with one another in the gaps since because of their spacing, the outer plates 32 cannot axially escape. The decelerating force acting on the coupling hub 26 assumes a minimum value. The viscous coupling acts like a free wheeling unit. If the direction of rotation is reversed, a situation as illustrated in FIG. 5 occurs. When the roller shutter moves from the open position into the closed position under the influence of its dead weight in the rotational direction B, the coupling hub 26 rotates relative to the stationary coupling housing 11. As a result of the hydrodynamic effect, the viscous medium contained in the operating chamber 31 is sheared in the gap between each two fixed outer plates 32, and in the narrowing gap between the segments of two inner plates positioned as illustrated in FIG. 4, the viscous medium generates a force causing a displacing movement which displaces the inner plates 37 in the toothing 30 in the axial direction until they come into contact with the respective adjoining outer plates 32, thus causing a friction contact. As the viscous medium has to pass through narrowing gaps, the effect is maintained and there results a braking effect which also acts on the movement of the roller shutter. Therefore, in the position as illustrated in FIG. 5, the inner plates 32 in the gap 44 are positioned at a distance 43 from one another.

The effect occurs automatically. There is no need for any external control. However, preconditions for accurate functioning are that the operating chamber 31 is filled 100% and that there exists a prepressure which is higher than the atmospheric pressure. To ensure this without fail, the second cover 18 is adjustable against the force of a spring 23 and is also loaded by the spring 23 which, furthermore, may be designed in such a way that an increase in pressure in the operating chamber 31 is compensated for if the coupling is affected by an outside temperature.

Figure 8A:
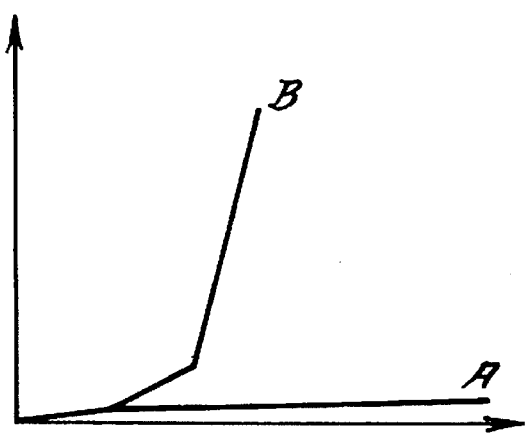
FIG. 8A shows a graph of the braking moment as a function of time.
Figure 8B:
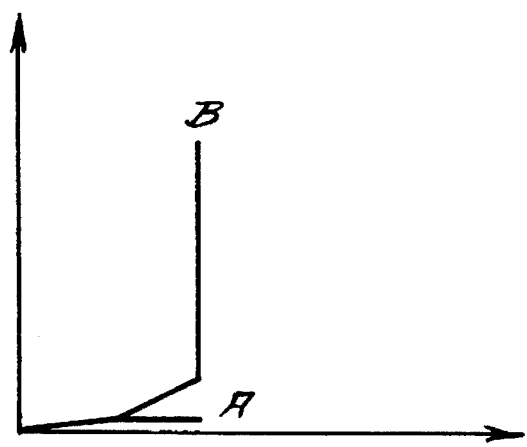
FIG. 8B shows a graph of the braking moment as a function of time at a constant speed differential.

FIG. 8A shows that there occurs a steep increase in braking moment, i.e. in the rotational direction corresponding to the rotational direction B and thus to the movement of the shutter from the open position into the closed position, whereas practically no moment or only a minimum moment is built up in respect of the rotational direction A which corresponds to lifting the shutter from the closed position into the open position by the motor. In the latter direction, the viscous coupling practically operates as a freewheeling unit. FIG. 8B shows the braking moment generated by the viscous coupling as a function of time at a constant speed differential Δn between the stationary coupling housing and the rotating coupling hub, the precondition for achieving a constant speed differential Δn being that the braking moment of the viscous coupling is equal to or greater than the respective bearing shaft torque generated by the force of the shutter weight.

What is claimed is:

1. A driving device for shutters, especially roller shutters, movable between a closed position and an open position, said driving device including:

a motor generating a rotational movement and a drive, which motor and drive, by means of driving elements act on the shutter by setting it to the open position, having means to automatically transfer the shutter into the closed position without assistance of the motor;

a braking element, which decelerates the automatic movement of the shutter into the closed position under its dead weight;

a viscous coupling, said viscous coupling acts as a braking element and comprises a coupling housing and a coupling hub as coupling parts which, between them, form an operating chamber, said operating chamber has the shape of an annular cylinder, said viscous coupling, furthermore, between the coupling housing and the coupling hub, comprises annular plates which are arranged in a predetermined sequence, which partially overlap in a radial direction and are arranged in the operating chamber, and which, furthermore, comprises a filling of a highly viscous medium which fills a part of the operating chamber not occupied by the plates and is subjected to a permanent pre-pressure which is higher than atmospheric pressure;

one of the two coupling parts is held non-rotatably;

the plates apply a braking moment increasing as a function of speed to the coupling part of the viscous coupling which participates in a rotational direction and rotational movement corresponding to movement of the shutter into the closed position; and that the plates, in a counter clockwise rotational direction opposed thereto corresponding to the movement of the shutter into the open position, said plates exert a minimum braking effect on the coupling part having rotational movement.

2. A driving device according to claim 1, wherein said part of the operating chamber is filled completely with a highly viscous medium.

3. A driving device according to claim 1, wherein said plates in the operating chamber that interact with the non-rotatably held coupling part are held at a fixed distance from one another by spacers.

4. A driving device according to claim 1, wherein said plates that interact with the non-rotatably held coupling part are provided with apertures or slots.

5. A driving device according to claim 1, wherein said coupling housing constitutes a non-rotatably held coupling part and a rotatably held coupling part.

6. A driving device according to claim 1, wherein said annular plates associated with the rotatable coupling part, at their outer and inner circumference, comprise slots which extend over part of a radial extension of said plates and form segments which are all inclined in a predetermined direction and dimension relative to a plane on which the rotational axis of the associated coupling part is positioned perpendicularly.

7. A driving device according to claim 1, wherein between each two spaced plates that interact with the non-rotatably held coupling part, there are arranged two plates which comprise inclined sectors and are associated with the rotatable coupling part, said plates are displaceable in a direction of the longitudinal axis of the coupling part and are rotatable therewith and that said two plates comprising inclined sectors are in phase and side by side that the sectors are inclined in opposite directions, thus forming gaps which narrow in a clockwise rotational direction of the rotatable coupling part, when the shutter is moved into the closed position.

8. A driving device according to claim 1, wherein said required prepressure is set while a remaining part of the operating chamber is filled with the viscous medium.

9. A driving device according to claim 1 further including a spring loaded piston for maintaining the prepressure in the operating chamber.

10. A driving device according to claim 1 wherein said viscous coupling is provided with a temperature compensating device which compensates for an increase in pressure from the pre-pressure in the operating chamber when changes in temperature occur.

11. A driving device according to claim 10, wherein said temperature compensating device comprises a piston adjustable against a spring.

12. A driving device according to claim 1, wherein said shutter is a roller shutter, the viscous coupling is associated with the roller serving to wind up the shutter.

13. A driving device according to claim 12, wherein said rotatable coupling part of the viscous coupling is connected to a bearing shaft of the roller.

14. A driving device according to claim 1, wherein said rotatable coupling part of the viscous coupling is connected to an output shaft of the motor of a drive connected thereto, or of a driving element connected thereto.

15. A driving device according to claim 1, wherein said shutter is a roller shutter, a driving element between the motor or the drive and the roller for winding up the roller shutter is provided as a chain drive.

* * * * *

UNITED STATES PATENT AND TRADEMARK OFFICE
CERTIFICATE OF CORRECTION

PATENT NO. : 5,634,507

DATED : June 3, 1997

INVENTOR(S) : Gerog Kwoka

It is certified that error appears in the above-identified patent and that said Letters Patent are hereby corrected as shown below:

Column 4, Line 65, delete "beating" and insert --- bearing ---.

Signed and Sealed this

Tenth Day of February, 1998

Attest:

BRUCE LEHMAN

Attesting Officer        Commissioner of Patents and Trademarks